United States Patent [19]
Mauer et al.

[11] Patent Number: 5,741,536
[45] Date of Patent: Apr. 21, 1998

[54] METHOD OF PASTEURIZING MEAT PRODUCTS

[75] Inventors: James E. Mauer, 111 Sequoia Dr., SE., Rome, Ga. 30161; Harry Stuckey, Cartersville, Ga.; Benedict DiGerlando, Cedar Bluff, Ala.

[73] Assignee: James E. Mauer, Rome, Ga.

[21] Appl. No.: 677,590

[22] Filed: Jul. 9, 1996

[51] Int. Cl.[6] ............................................. A23L 3/16
[52] U.S. Cl. ........................... 426/520; 426/281; 426/312; 426/521; 99/443 R; 99/443 C; 99/476
[58] Field of Search .................................. 426/281, 312, 426/521, 520; 99/443 C, 476, 443 R

[56] References Cited

U.S. PATENT DOCUMENTS

| 4,342,788 | 8/1982 | Clatfelter et al. | 426/243 |
|---|---|---|---|
| 4,737,373 | 4/1988 | Forney | 99/443 R X |
| 4,784,863 | 11/1988 | Lustig et al. | 426/113 |
| 5,069,922 | 12/1991 | Brotsky et al. | 426/332 |
| 5,078,120 | 1/1992 | Hwang | 99/476 X |
| 5,189,948 | 3/1993 | Liebermann | 99/443 C |
| 5,439,694 | 8/1995 | Morris, Jr. | 426/521 X |
| 5,458,901 | 10/1995 | Engler et al. | 426/521 |
| 5,832,391 | 1/1995 | Juhl et al. | 264/22 |

*Primary Examiner*—Milton Cano
*Attorney, Agent, or Firm*—Finnegan, Henderson, Farabow, Garrett & Dunner, L.L.P.

[57] ABSTRACT

A process for preparing prepackaged pasteurized meat parts in which the parts are pasteurized at a low temperature for an extended period of time so as to enable thorough and even heating of the parts to eliminate bacterial contamination within the parts. After the parts have been pasteurized, the pasteurized parts are cooled and then frozen. The frozen parts are then packaged for shipment and sale.

20 Claims, 4 Drawing Sheets

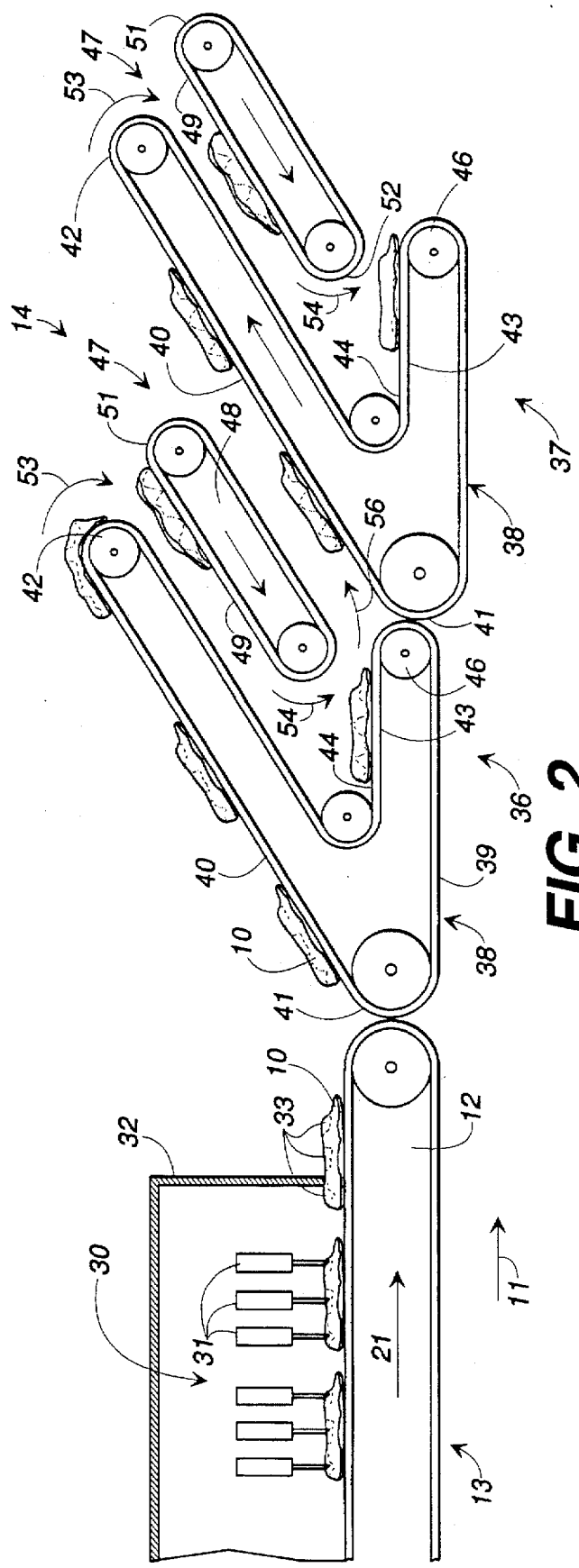

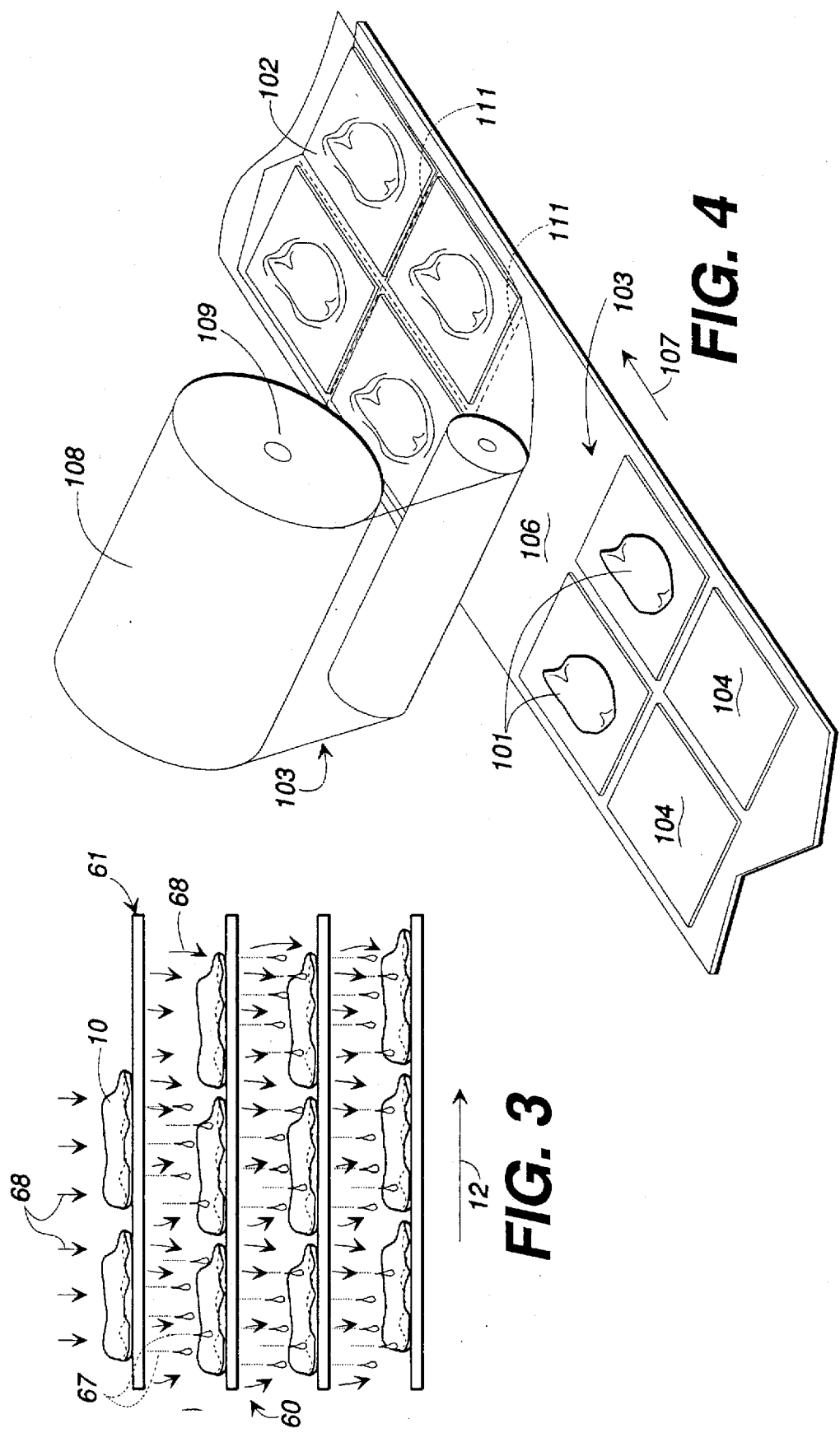

METHOD OF PASTEURIZING MEAT PRODUCTS

FIELD OF THE INVENTION

The present invention relates in general to a method of processing meat products for packaging and sale. The term "meat products" as used herein means beef, pork, poultry and other fowl and veal. In particular, the present invention relates to a method of pasteurizing cut meat products as they are moved along the processing path to essentially eliminate bacterial contamination within the parts while retaining moistness and quality of taste and appearance of the parts, and thereafter cooling and freezing the parts so as to prepare the parts for packaging for sale.

BACKGROUND OF THE INVENTION

One of the fastest growing and most profitable segments of the food service industry involves the preparation of precooked, packaged meat products such as chicken parts, beef and pork products for sale on retail and institutional levels. The market for such products has increased dramatically in the areas of home retail sales and restaurant sales as more and more people have less time to go to the trouble of preparing and cooking fresh meats, and thus find it much easier and faster to use precooked foods which require substantially less cooking/preparation/heating time. Additionally, for restaurants, the use of such precooked meat products yields faster service of orders, and the uniformity of these products enables restaurants to serve generally uniform sized portions. Also, since at the consumer level, the cooking time of precooked meat products is less than that for fresh or uncooked products, restaurants do not need as extensive cooking equipment to prepare and serve a significant volume of meals.

A significant problem that arises with packaged meat products, however, is the danger of contamination of such meat products due to bacteria. If not properly prepared and adequately cooked before being packaged, such food products can pass bacterial contaminates onto the end users, posing a serious health risk to the end users. This health risk has become especially prominent in the last several years in light of recent well publicized instances of *"E-coli"* and salmonella poisoning, etc. due to contaminated meat products being served at restaurants across the United States.

Conventional industrial food cooking processes have focused on the cooking of such meat products at relatively high temperatures in order to speed the cooking time required to cook the products. Such rapid cooking of the meat products under relatively high heat, however, creates much less attractive products often having blood spots or other discolorations therein. Further, when cooking the products rapidly, there is still a danger of the products not being thoroughly cooked, especially through the bones of the product, which contain blood, marrow, etc., where bacteria can take hold. In addition, rapid cooking of the products at high heat further tends to dry out the products making the products tougher and adversely affects their taste.

An example of a conventional cooking system for meat parts, is taught by U.S. Reissue Pat. No. 33,510 of Williams. Williams teaches a steam cooking system in which products of substantially uniform size and weight, such as chicken parts, are sprayed with a water spray and thereafter are passed into a steam chamber in which the pans are exposed to an environment of 100% humidity at approximately 100° C. (212° F.). The principal purpose of the system of Williams is to cook the uniformly sized meat parts at an increased heat and moisture while attempting to retain the juices and flavor of the product. Williams, however, does not appear to address the problem of reducing the contamination of the products as they are moved through the cooking apparatus. In fact, Williams uses steam partially generated from the heating of water collected at the bottom of the cooking apparatus. Such collected water contains collected drippings and bacterial contaminates secreted from the parts as they are cooked. As this water is heated and becomes steam that is directed throughout the cooking apparatus, the parts are continually exposed to potentially contaminating steam.

In addition, the products or parts enter the cooking apparatus of Williams at the top thereof so that the raw parts are at the top of the cooking apparatus, which raw parts tend to secrete and drip matter, including contaminating matter, downwardly onto the cooked products, at the lower areas of the cooking apparatus. The system shown in Williams also requires an additional processing step of segregating the meat parts to parts of relatively uniform size and shape before such parts can be moved through and cooked in the cooking apparatus of Williams. After the products have been cooked, the cooked products apparently then must be desegregated prior to packaging, for example for the packaging of whole birds in "eight piece packs".

Systems such as Williams, which are designed to provide faster cooking of the meat parts in the processing plant, thus tend to require additional processing steps and cannot uniformly cook a variety of different size and weight products at the same time. Additionally, most conventional cooking processes are not specifically directed or designed for ensuring that bacterial contaminates contained in the meat parts are substantially reduced or eliminated prior to packaging and sale to consumers. As a result, while cooking times for such precooked, prepackaged meat products are generally reduced over the cooking times for fresh products, it typically is still necessary for the end consumer to cook the products for a significantly long time to ensure that the products are thoroughly cooked throughout to reduce or eliminate any contamination therein.

Accordingly, it can be seen that beyond traditional methods of precooking product, a need exists for a process of pasteurizing and prepackaging meat products, in which the potential for bacterial contamination has been substantially reduced and/or eliminated and which provides a safe, healthy meat product that can be rapidly cooked by an end consumer and which, unlike precooked product, retains moisture and quality of flavor and appearance.

SUMMARY OF THE INVENTION

Briefly described, the present invention comprises a method for heat treating, or heat processing and thereby pasteurizing cut meat parts or products of varying sizes for packaging and sale, in which bacterial contamination has been substantially reduced and/or eliminated, but which retains a fresh, moist taste and appearance, and which can be rapidly and easily prepared by the end consumer.

In a first embodiment of the present invention, the cut meat parts, such as the breasts, backs, legs, thighs, etc. . . . of poultry carcasses, are moved from a cut-up line and are deposited on a pasteurizing line. The parts are moved along the pasteurizing line along a processing path through a series of stations for the pasteurizing and freezing of the parts. The first parts are passed through a marinating station, wherein the parts are marinated. Typically the parts are marinated by being injected with a marinade solution to improve the moistness and flavor of the products as they are pasteurized. Thereafter, the parts are massaged at a second station by being moved through a series of flips, wherein the products are reoriented by dropping the parts onto a series of conveyor belts. As the parts are flipped back and forth, the marinade solution, which generally has tended to be concentrated in pockets adjacent the skin of the part where it is injected, is distributed substantially evenly throughout the parts.

Following marination and massaging of the parts, the parts generally are reoriented so that their skin sides are facing upwardly as the parts enter a heating unit. The parts enter the heating unit at a low elevation and are received on a spiral conveyor that progressively winds in a helical fashion upwardly through the heating unit toward the top thereof. The spiral conveyor further is perforated to allow juices secreted by the parts at higher elevations within the heating unit to drip downwardly onto the parts at the lower elevations. This provides a natural, automatic basting of the parts as they proceed through the heating unit. The parts generally are exposed to relatively lower heats of less then 200° F. and are heat treated for approximately 40–50 minutes or longer, until pasteurized. Further, the parts are subjected to forced streams or flows of heated air that dry or mixed with steam up to 100% and which are directed against the parts as the parts are pasteurized in the heating unit. Such increased pasteurizing times of the parts at relatively lower temperatures than those used by most conventional industrial cooking systems together with the impingement of the parts with heated, forced air flows, tends to create an even, deep penetration of heat all the way through the parts to the bones thereof. As a result, the parts are evenly and thoroughly pasteurized to kill any bacteria contamination therein. The bones of the parts also are uniformly heated so that the marrow and blood therein is denatured, and thus any bacteria within the bones is generally killed to substantially eliminate any contamination through the bacteria within the parts.

After the parts have been pasteurized in the heating unit, the parts thereafter are moved into a precooling station positioned immediately downstream from the outlet end of the heating unit. In the precooling station, the parts are subjected to temperatures of between approximately −20° F. to 0° F. for approximately 30–40 minutes to cool the hot, pasteurized parts to a temperature of between 40° F. to 50° F. Thereafter, the parts are moved into a freezer where they are flash frozen by exposure to liquid nitrogen for approximately 20 minutes. The precooling of the parts prior to freezing helps reduce the incidence of moisture within the parts being drawn to the surface, as generally happens by simply flash freezing the parts, and thus, drying out the parts. The products are maintained in the freezer for a time sufficient to lower their temperature to 0° F. or less so that the parts are frozen solid. Thereafter, the frozen parts are packaged for shipment and sale to end consumers for both institutional and retail markets.

In a second embodiment of the present invention, cut poultry breasts are processed. Typically, the poultry breasts will have been deboned prior to being deposited on the pasteurizing line. The breasts initially are placed in pouches or pockets formed between sheets of a thermoplastic material. The sealed packages thereafter are moved into a heating unit, wherein the packages are exposed to relatively lower heats of less than 200° F. for approximately 15–20 minutes. This enables heat to thoroughly penetrate the breasts to pasteurize the breasts and eliminate any bacterial contamination therein. The packages also retain the natural juices and/or any marinade solution injected into the parts within the packages to maintain the moistness and flavor of the breasts.

After being pasteurized the pouches are doused with cool water sprays of approximately 60° F. to 70° F. for approximately 5–10 minutes to reduce the temperature of the pouches to approximately 60° F. to 70° F. Thereafter, the pouches are moved into a mechanical freezing station where the breasts are frozen to approximately 0° F. Thereafter, the pouches are packed for shipment for sale through institutional and retail channels.

The resultant pasteurized, packaged breast products require much less preparation and serve time, as it can typically be prepared and served in approximately 7–8 minutes and can be cooked by simply placing the pouch in hot water so that extensive cooking equipment is not needed. Thus, the packaged breast products formed by the second embodiment of the present invention are safe and versatile to enable them to be cooked and served without requiring a full kitchen set-up for the preparation of the breast product.

Accordingly, it is an object of the present invention to provide a method of pasteurizing meat products without adversely affecting their appearance, taste, texture and quality.

Another object of this invention is to provide a method of preparing prepackaged pasteurized meat products in which contamination due to bacteria within the meat products has been essentially eliminated to provide a safer product that is easier to prepare and serve to the end consumer.

Another object of this invention is to provide an improved method of preparing prepackaged meat products, requiring substantially less preparation and serve time by the end consumer.

Another object of this invention is to provide a method of preparing prepackaged meat products which are pasteurized to essentially eliminate bacterial contamination therein, while retaining moistness and flavor of the products.

Still another object of the present invention is to provide a method of preparing prepackaged meat parts, in which meat parts of substantially different sizes and weights can be pasteurized together, with each part being substantially evenly heated, so as to not require segregation of the parts by size and weight prior to pasteurizing.

Still another object of the present invention is to provide a process for preparing pasteurized, prepackaged meat products having a more attractive appearance and an improved taste and texture.

Various other objects, features and advantages of the present invention will become apparent to those skilled in the art upon reading the following detailed description when taken in conjunction with the accompanying drawings.

BRIEF DESCRIPTION OF THE DRAWINGS

FIG. 2 is a side elevational view schematically illustrating the marination and massaging of the parts to distribute the marinade solution throughout the parts.

FIG. 3 is a side elevational view schematically illustrating the forced airstreams of the heating unit impinging against and passing the meat parts about as well as the leakage of juices, etc. from the parts at higher elevation basting the parts at lower elevations.

FIG. 4 is respective illustration of the formation of the pouches in which poultry breasts are placed and sealed for pasteurizing according to a second embodiment present invention.

DETAILED DESCRIPTION OF A PREFERRED EMBODIMENT

Figure 1:
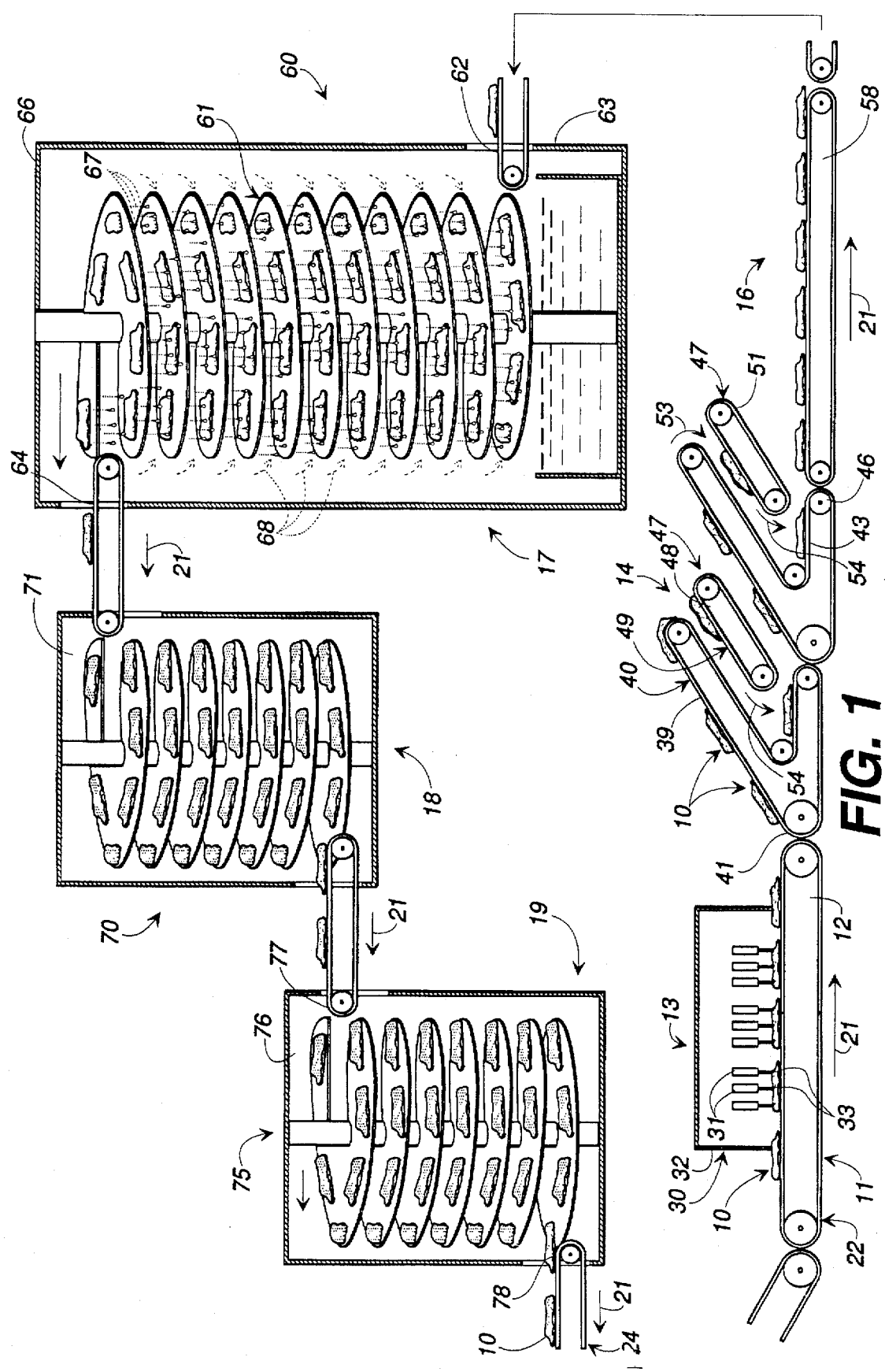
FIG. 1 is a schematic illustration of a first embodiment of the process for pasteurizing meat products according to the present invention.

Referring now in greater detail to the drawings in which like numerals indicate like parts throughout the several views, FIG. 1 schematically illustrates a first embodiment of the process according to the present invention for heat treating, or heat processing and thereby pasteurizing cut meat products or parts 10. In general, the meat parts 10 comprise cut sections or segments or carcasses such as poultry carcasses, beef or pork. For example, the process of the present invention can be utilized for heat treating, heat processing and thereby pasteurizing poultry parts for packaging, shipment and sale to retail and institutional buyers. Thus, the parts would include breasts, thighs, drumsticks, backs and fillets or tenders of meat all being processed together.

In the first embodiment of the present invention shown in FIG. 1, the parts 10 generally will be transported directly from a cut-up line (not shown) to a pasteurizing line 11. The parts need not be segregated by size or weight prior to being placed on the pasteurizing line. Instead, the present invention enables parts of different sizes, and irregular shapes, i.e. the legs, thighs, breasts, etc of poultry carcasses to be processed together without regard to differences in the size or shapes of the parts. As shown in FIG. 1, the pasteurizing line 11 includes a series of conveyor line 12 which carry the parts 10 through a series of processing stations 13–19 as the parts are moved along a processing path indicated by arrows 21. The parts are fed onto the pasteurizing line 11 at an inlet end 22 of the pasteurizing line by transfer means such as a conveyor or slide 23. The parts proceed through their various processing stations 13–19 for marination, pasteurizing and freezing of the parts after which the parts are discharged from the pasteurizing line at a discharge area 24 thereof for packaging of the frozen parts for shipment and sale.

As shown in FIG. 1, as the meat parts 10 begin their movement along the pasteurizing line 11 and along the processing path 21, they initially are moved into the first processing station 13 wherein the parts are marinated. Typically, the first processing station 13 will comprise a injection type marinating system 30 having a series of injection needles 31 mounted within a housing 32. A series of parts 10 are moved into the housing 32 whereupon the needles 31 are moved downwardly into engagement with the parts, piercing the skin and meat thereof. The needles inject a solution of water, salt and phosphates designed to maintain moistness or juiciness of the product during pasteurizing. The marinade solution is injected into the tissues of the parts, with the solution typically pooling in the pockets 33 formed adjacent the points of entry of the needles. It will also be understood by those skilled in the art that other blends of marinating solutions can be used with the present invention to marinate and provide moistness/juiciness to the meat parts. Further, other methods of marinating the parts such as emersion of the parts in marinating solutions can be used in place of the injection marinade system of the present invention.

As FIGS. 1 & 2 illustrate, once the parts have been injected with the desired amount of the marinade solution, the parts thereafter are moved into the second processing station 14 in which the parts are massaged. The second processing station 14 is a flipping station that includes at least two sets of flipping conveyor assemblies 36 & 37. Each of the flipping conveyor assemblies generally includes a substantially C-shaped first flipping conveyor 38 having an endless moving conveyor belt 39, and including an inclined upper run portion 40 with a proximal end 41 and a distal end 42, and a lower run 43 that extends substantially horizontally and has a proximal end 44 and a distal end 46. A second flipping conveyor 47 is received between the upper and lower runs 40 & 43 of each of the first flipping conveyors 38, extending downwardly at an angle substantially parallel to the upper run 40 of conveyor 38. Each second flipping conveyor 47, like each first flipping conveyor 38, includes an endless moving conveyor belt 48 and has an upper run 49 on which the parts are received and moved downwardly and rearwardly along the processing path 21 toward the proximal ends 44 of the lower runs 43 of the first flipping conveyors 38, and proximal and distal ends 51 and 52.

As illustrated in FIGS. 1 & 2, as the meat parts 10 move along their processing path 21 through the massaging station 14, the parts are moved through a series of flips. Generally, the parts are moved through four (4) flips as the parts are passed between the first and second flipping conveyors of the flipping conveyor assemblies 36 & 37. Initially, the parts are moved through the first flipping conveyor assembly 36 which tends to flip the parts onto their top from their bottom sides as the parts are moved off of the distal end 42 of the upper run 40 of the first flipping conveyor 38 onto the second flipping conveyor 47 in the direction of the arrows 53. Thereafter, the inverted parts are moved downwardly along the upper run 49 of the second flipping conveyor 47 toward its distal end 52 whereat the parts are flipped over and downwardly onto the lower run 43 of the first flipping conveyor 38 in the direction of arrow 54.

The parts thereafter are transferred from the distal end 46 of the lower run 43 of the first flipping conveyor 38 of flipping conveyor assembly 36 onto the proximal end 41 of the upper run 39 of the first flipping conveyor or flipping conveyor assembly 37, and again are moved upwardly at an angle and are flipped over and downwardly onto the upper surface of the second flipping conveyor of flipping conveyor assembly 37 in the direction of arrow 56. The parts then are moved off of the distal end of the second flipping conveyor of flipping conveyor assembly 37 flipping over and downwardly in the direction of arrow 57 onto the lower run 43 of the first flipping conveyor 38 of the flipping conveyor assembly 37. Such flipping motion tends to massage the meat parts 10 so as to cause the pockets 33 of marinade solution to become dispersed throughout the meat parts as the meat parts are flipped from side to side as indicated in FIG. 2. It further will be understood that other means for massaging or tumbling the meat parts can be utilized as well for applying pressure and causing the distribution of the marinade solution through the meat parts.

After the marinade solution has been distributed throughout the meat parts, the pans are moved from flipping conveyor assembly 37 through a third processing station 16 (FIG. 1). The third station 16 comprises an inspection station for the parts and includes an elongated conveyor 58 along which the parts are conveyed for inspection. The meat parts also generally are reoriented in the third station 16 so that their skin sides are facing upwardly. This ensures that the skin sides of the parts will be facing upwardly as the parts are moved into the fourth processing station which comprises a heating unit 60 so that as the parts are moved through the heating unit, the juices that sweat or weep out of the parts as the parts are cooked fall downwardly onto the uncooked products below and tend to baste the skin and meat of the meat parts for moistness and natural flavoring.

As FIG. 1 illustrates, after being inspected and reoriented with their skin sides facing upwardly, the meat parts are moved into a heating unit which comprises the fourth processing station 17. In general, the heating unit 60 comprises a large industrial heating unit such as, for example, a heating unit model GC076 manufactured by the Stein Company of Sandusky, Ohio. The heating unit includes a spiral flighted conveyor 61 that is substantially helically shaped and extends upwardly in a helical fashion from a lower inlet end 62 at the lower end 63 of the heating unit 60 upwardly to an outlet 64 at the top or upper end 66 of the heating unit 60. The spiral conveyor typically is formed from a metal mesh or similar material so as to be capable of withstanding high temperatures without buckling or being destroyed. The conveyor further is perforated to enable juices, etc. which are excreted from the meat parts to pass through the conveyor and drip downwardly onto the meat parts at the lower elevations as indicated in by the dashed lines 67 in FIG. 1.

As shown, the meat parts enter the heating unit 60 at the lower end 63 or bottom thereof, and are progressively moved upwardly in a spiral path toward the top 66 of the heating unit. The heating unit generally is heated to temperatures of 200° F. or less, and preferably in range of between 195° F. to 200° F., to heat treat or processes and thereby pasteurize the parts as they are moved through the heating unit. The parts can be heat treated or processed using dry air, 100% steam, or a mixture of dry air and steam as desired for maintaining the moistness etc. of the parts. The parts generally are so treated for approximately 45 to 50 minutes until pasteurized.

In order to pasteurize the parts thoroughly, the parts further are subjected to heated airflows or airstreams, indicated by arrows 68, that are directed against and around the parts. Such impingement of the parts with the heated airflows further contributes to the deep, even penetration of heat through the parts. As a result of such increased pasteurizing times at lower heating temperatures, the meat parts are pasteurized throughout so as to cause the entire parts, including the meat and bones thereof, to be deeply and evenly heated. Accordingly, any bacterial contamination within the meat and bones of the meat parts is essentially eliminated. Further, the blood and marrow within the bones of the parts is denatured and the bones are caused to turn white so as to further reduce the chances of bacterial contamination and to provide the parts with a more pleasing, appetizing appearance.

At the same time, moving the parts from the lower elevations of the heating unit upwardly to the upper elevations of the heating unit for cooking further tends to reduce the chances of the parts being exposed to bacterial contamination within the heating unit itself due to leakage of juices, which might include some contaminating material, from the raw parts as they are initially treated or processed. The leakage of juices from the pasteurized parts, however, tends to baste the raw or unpasteurized parts without the danger of contaminating parts so as to further flavor and maintain moistness and juiciness of the parts. This results in a safe, easy to handle product that retains a pleasing appearance and taste and in which the moistness and juiciness of the parts is maintained.

After being pasteurized, the meat parts 10 are moved from the heating unit 60 into a precooler 70 that forms the fifth processing station 18. The precooler generally comprises a chilling or cooling chamber 71 through which the parts are moved and cooled from their heated pasteurizing temperatures of between 195° F. to 200° F. The parts are exposed to temperatures typically in the range of –20° F. to 0° F. or less for approximately 30 to 40 minutes. As a result, the internal temperature of the parts is lowered to approximately 40° F. to 50° F. to help seal in the moisture and thus the natural flavoring of the parts.

Once the parts have been substantially cooled to approximately 40° F. to 50° F., the parts are introduced into the final processing station 19, which comprises a freezing unit 75. The freezing unit 75 is an open ended unit having a cooling chamber 76 with open inlet and outlet ends 77 and 78 and through which the parts pass in a substantially serpentine path. In the freezing unit, the parts are exposed to liquid nitrogen for approximately 20 to 30 minutes. Such exposure to liquid nitrogen reduces the core temperatures of the parts to approximately 0° F. or less. The parts thus are frozen solid as they move through the freezer to prepare the parts for packaging for shipment and later sale.

The carrying out of the freezing process in two steps wherein the parts are first precooled to approximately 40° F. to 50° F. prior to being frozen solid prevents freezer burn and advantageously enables the moistness and juiciness of the parts to be retained within the parts after being frozen. Typically, as freshly pasteurized parts, which generally are of the temperature of approximately 200° F. or greater in conventional processes, are exposed to a liquid nitrogen environment, such as in a freezer, the parts tend to become frozen very quickly. However, such extreme low temperatures further tend to cause the juices within the parts to leak or migrate towards the skin, tending to dry out the products. This affects the taste and consistency of the products when cooked and served by the end user. Progressively lowering the temperature of the parts prior to freezing avoids the potential for the marinade and juices within the parts to be leached out of the parts or drawn to the skin as occurs when hot, just cooled products are immediately frozen. The precooling thus avoids the parts becoming dried out and affecting their taste and texture as they are thereafter moved through the final processing station 19 for freezing.

The resultant product formed by the process of the present invention thus is substantially cleaned of bacterial contaminants so as to make the product much safer to handle and consume by the end consumer. In addition, the product formed by the present invention can be prepared and served by the end consumer in approximately 7 to 10 minutes, and provides a moist, flavorful product that has a very pleasing, appetizing appearance with the bones of the product being white and clean looking in appearance. The product can be served on a large institutional basis in a much more rapid and efficient manner than conventional quick frozen products, without sacrificing any of the taste, moistness, or appearance of the products, and which further provides a much safer product, in which the dangers of bacterial contamination thereof have been substantially eliminated.

DESCRIPTION OF SECOND PREFERRED EMBODIMENT

Figure 5:
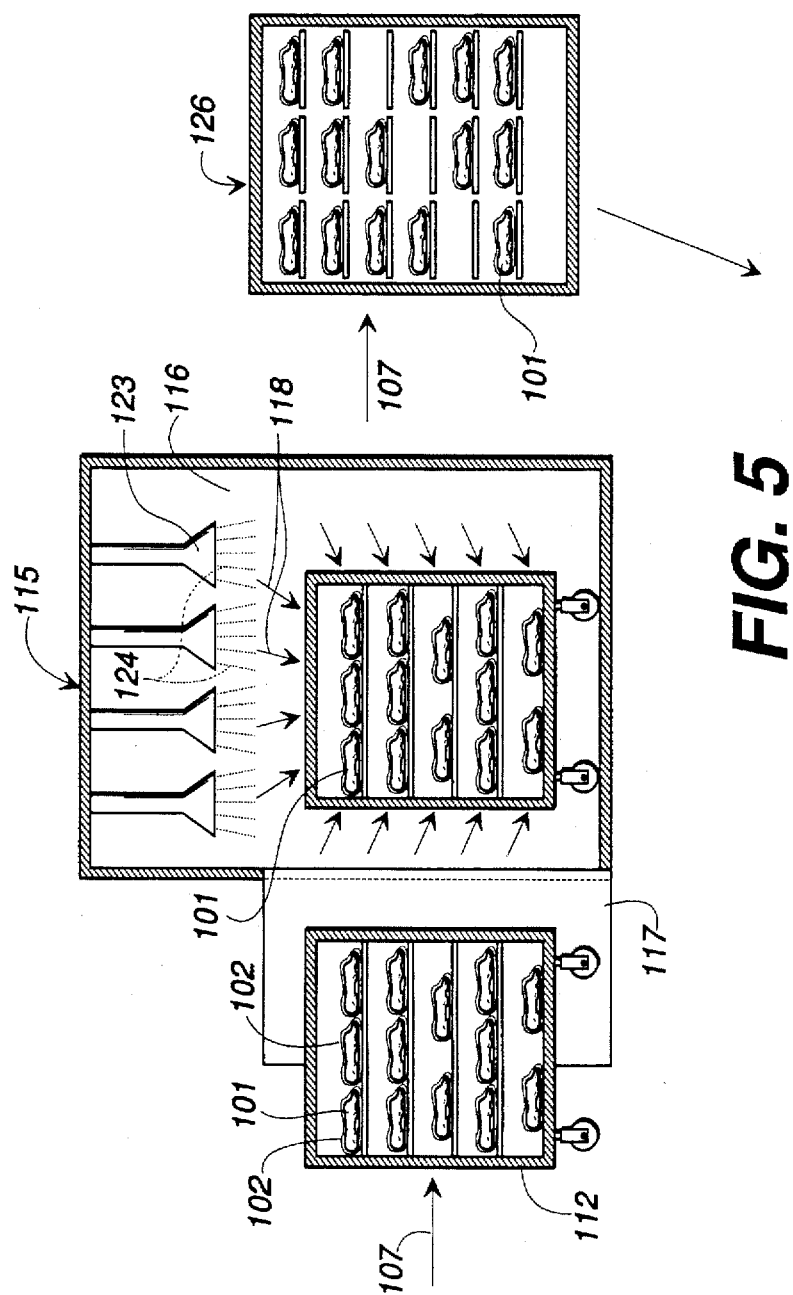
FIG. 5 is a schematic illustration of the second embodiment of the process for pasteurizing cut meat parts according to the present invention.

FIGS. 4 and 5 illustrate a second embodiment 100 of the present invention in which poultry breasts 101 are sealed and pasteurized in sterile pouches or packages 102. As shown in FIG. 4, the pouches 102 are formed from sheets of a thermoplastic film 103 such as a 0.5 mil polypropylene/2 mil Surbyn, or either thermoplastic resin to 1.5 mil polypropylene/3 mil extended film such as is sold under the trade name Winpak OPSU 12503 or PSU 3875, which is flexible and can be sealed substantially air and moisture tight. The pouches generally are formed by first drawing pockets 104 within a first or lower sheet 106 of the thermoplastic film material. The pockets are formed, for example, by the application of a vacuum (not shown) or by drawing the pockets into a tray or a mold (not shown) over which the lower sheet of film 106 is being passed as it is moved along a processing path in the direction of arrow 107.

The pockets 104 formed in the lower sheet of film 106 generally are sized and shaped so as to fit the poultry breasts therewithin and to accommodate poultry breasts of varying sizes. Typically, the breasts previously will have been deboned prior to being placed within the pockets as illustrated in FIG. 4. However, it will be understood by those skilled in the art that bone-in breasts additionally can be used within the pockets for processing in the method of the present invention. After the breasts have been placed in the pockets 104 formed in the lower sheet of film 106, an upper sheet of thermoplastic film 108 is placed over the lower sheet of film, covering the breasts as shown in FIG. 4. The upper sheet of film is fed from a supply 109 downwardly over the top of the lower sheet of film and is sealed against the lower sheet of film such as by a vacuum means to form the sterile, sealed, pouches or packages 102. The sealed sheets of thermoplastic film 106 and 108 thereafter generally are cut such as along lines 111 to separate the pouches from one another. The segmented pouches are then placed on racks 112 (FIG. 5) for pasteurizing.

As shown in FIG. 5, the racks 112 with pouches 102 containing poultry breast 101 are placed in a heating unit 115 for pasteurizing the poultry breasts. The heating unit 115 typically is a smokehouse type heating unit having a large pasteurizing chamber 116 in which the racks 112 can be placed, or which as an alternative can include internal racks on which trays of the poultry breast containing pouches can be placed for pasteurizing. Once the pouches have been placed within the pasteurizing chamber 116 of the heating unit 115, the doors 117 of the heating unit are sealed and the heating unit is heated to approximately 190° F. to 200° F. The heat further is typically directed about the pouches in heated, forced airflows or streams of dry air, 100% steam or a mixture of dry air and steam, as indicated by arrows 118. The pouches are maintained in the heating unit for approximately 15 to 20 minutes.

Conventional cooking methods for poultry breasts typically cook the poultry breasts at temperatures significantly greater than 200° F. for less than half the time of the pasteurizing process of the present invention. By pasteurizing at a lower heat of below 200° F. for an increased time of 15 to 20 minutes the present invention enables a thorough and even penetration of heat throughout the poultry breasts. This ensures that the poultry breasts are evenly and completely pasteurized to substantially eliminate any bacterial contamination therein. Additionally, the sealing of the poultry breasts within the pouches further tends to seal any natural juices and/or marinade solution within the pouches so that as the breasts are pasteurized, they tend to marinate themselves in their own natural juices so that they are naturally basted and thus their natural flavoring is sealed therein.

After the poultry breasts have been pasteurized, they are then precooled in the heating unit 115. As shown in FIG. 5, a series of showers 123 are mounted within the pasteurizing chamber 116. The showers spray the heated pouches 102 with chilled water sprays, indicated by dashed lines 124 for approximately 5 to 10 minutes. The water sprays chill the poultry breasts to approximately 60° F. to 70° F. prior to freezing of the pouches and their breasts. The pouches 102 containing the pasteurized poultry breasts 101 thereafter are moved from the heating unit 115 into a freezer 126. The freezer 126 generally is a mechanical blast freezer in which the pouches are received and are exposed to temperatures of 0° F. or less for approximately 4 to 5 hours. As a result, the poultry breasts are frozen solid in a slow freezing process so as to seal the natural juices and flavoring within the poultry breast while avoiding freezer burn and loss of moistness and taste. Thereafter, the frozen pouches and their poultry breasts are packaged for shipment and sale.

The resultant pasteurized poultry breast product formed by the process of the second embodiment of the present invention thus is safer and easier to handle and prepare by the end consumer than products prepared by conventional cooking processes as any bacterial contamination therewithin essentially has been removed during the pasteurization of the poultry breasts. Additionally, the pouch sealed poultry breast products formed by the process of the present invention are extremely versatile in that the cooking and preparation of these products can be done by the end user either on a grill or in an oven, or even can be cooked by emersion of the pouch in hot water with the time to reconstitute the poultry breasts generally being less than 7 to 10 minutes. Thus, the poultry breast products formed by the process of the present invention can be quickly and easily prepared and served to a consumer without requiring a full kitchen set up of a grill, etc. to cook the parts. This significantly reduces the amount of cooking equipment need by restaurants, etc by reducing preparation and service times for the product.

Various features, modifications and advantages of the present invention will become apparent to those skilled in the art upon reading the following detailed description when taken in conjunction with the accompanying drawings.

What is claimed is:

1. A process for pasteurizing meat parts for packaging and shipment of the parts, comprising the steps of:

marinating the parts with a marinade solution as the parts are moved along a processing path;

massaging the parts to distribute the marinade solution therethrough;

moving the parts through a heating means with the parts entering the heating means at a lower elevation and moving to higher elevations as the parts move through the heating means;

pasteurizing the parts at temperatures less than approximately 200° F. for an extended time sufficient to pasteurize the parts substantially uniformly throughout;

precooling the parts; and after the parts have been precooled, freezing the parts.

2. The process of claim 1 and wherein the step of pasteurizing the parts comprises directing forced air streams toward the parts as the parts are moved through the heating means to cause a substantially even deep penetration of heat to pasteurize the parts.

3. The process of claim 1 and wherein the step of marinating the parts comprises injecting the marinade solution into the parts.

4. The process of claim 1 and wherein the step of precooling the parts comprises moving the parts through a precooling means for approximately 30–45 minutes.

5. The process of claim 4 and wherein the parts are exposed to temperatures of approximately −20° F. to 0° F. in the precooling means.

6. The process of claim 1 and wherein the step of massaging the parts comprises flipping the parts from side to side.

7. The process of claim 1 and further including the step of reorienting the parts with their skin sides facing upwardly.

8. The process of claim 1 and wherein the step of freezing includes exposing the parts to a freezing means for approximately 20–30 minutes to lower the temperatures of the parts to approximately 0° F.

9. The process of claim 1 and wherein as the parts move through the heating means, basting the parts at lower elevations with drippings from the parts at higher elevations within the heating means to flavor and seal moisture within the parts.

10. The process of claim 1 and wherein the step of pasteurizing the parts comprises heating the parts at between approximately 195° F. to 200° F. for approximately 40–55 minutes.

11. The process of claim 1 and wherein the step of pasteurizing the parts comprises heating the parts with steam.

12. A process for pasteurizing cut meat parts to reduce the potential contamination of the parts from bacteria and create a meat product that requires reduced preparation time by an end user while still maintaining moistness and quality of taste of the parts, comprising the steps of:

moving a series of parts along a processing path;

marinating the parts with a marinade solution;

moving the parts into a heating means with the parts entering the heating means at a lower elevation and moving to progressively higher elevations within the heating means, as the parts move through the heating means, impinging the parts with heated forced air flows for an increased time to enable deep even penetration of heat through the parts to pasteurize the parts to essentially eliminate bacterial contamination therein;

precooling the parts; and after the parts have been precooled, freezing the parts.

13. The process of claim 12 and wherein the step of marinating the parts comprises injecting the marinade solution into the parts.

14. The process of claim 12 and wherein the step of precooling the parts comprises moving the parts through a cooling means for approximately 30–45 minutes.

15. The process of claim 12 and further including the step of reorienting the parts with their skin sides facing upwardly.

16. The process of claim 12 and further including the step of massaging the parts after marinating to distribute the marinade solution throughout the parts.

17. The process of claim 12 and as the parts move through the heating means, pasteurizing the parts with steam.

18. The process of claim 12 and wherein as the parts move through the heating means, basting the parts at lower elevations with drippings from the parts at high elevations to flavor and seal moisture within the parts.

19. The process of claim 12 and wherein the step of impinging the parts comprises heating the parts at between approximately 195° F. to 200° F. for approximately 40–55 minutes.

20. Pasteurized packaged meat parts having potential bacterial contamination therein minimized while retaining moistness and quality of taste and which require significantly reduced preparation time by an end user, formed by the process comprising the steps of:

marinating the parts with marinade solution massaging the parts to distribute the marinade solution therethrough;

moving the parts through a heating means and impinging the parts with forced heated air flows for an increased time to enable substantially even deep penetration of heat through the parts to pasteurize the parts to essentially eliminate bacterial contamination therein;

precooling the parts to initially reduce their temperature;

freezing the parts in a freezing means; and packaging the parts for shipment.

* * * * *